United States Patent
Minami et al.

[15] 3,663,106
[45] May 16, 1972

[54] OPTICAL NULL METHOD SPECTROPHOTOMETERS

[72] Inventors: Shigeo Minami, Ashiya; Kenji Fukuda, Katsuta, both of Japan

[73] Assignee: Hitachi, Ltd., Tokyo, Japan

[22] Filed: May 26, 1970

[21] Appl. No.: 40,513

[30] Foreign Application Priority Data

May 28, 1969 Japan..................................44/40964

[52] U.S. Cl. ..........................356/89, 250/435 R, 250/226, 356/51, 356/93
[51] Int. Cl. .......................................G01j 3/42, G01n 21/34
[58] Field of Search ..................356/83, 88, 95, 51; 250/226, 250/43.5 R

[56] References Cited

UNITED STATES PATENTS

| | | |
|---|---|---|
| 3,437,411 | 4/1969 | Rudomanski et al..................356/89 |
| 3,449,050 | 6/1969 | Keahl.........................................356/89 |
| 3,486,822 | 12/1969 | Harris.......................................356/83 |

Primary Examiner—Ronald L. Wibert
Assistant Examiner—V. P. McGraw
Attorney—Craig, Antonelli & Hill

[57] ABSTRACT

An optical null method spectrophotometer with which the difference between the intensity of a test sample beam representing the quantity of light transmitted through a test sample and the intensity of a reference sample beam representing the quantity of light transmitted through a reference sample is detected and amplified to drive a servo mechanism to thereby displace an optical attenuator inserted in the path of the reference beam, so as to vary the reference sample beam until the test sample beam and the reference sample beam are balanced with each other to thereby obtain transmission spectra or absorption spectra of the test sample, characterized in that separate means is provided for producing an electrical signal proportional to the variation in the reference sample beam resulting from the displacement of the optical attenuator and that the electrical signal produced by the separate means is recorded by a recorder.

14 Claims, 3 Drawing Figures

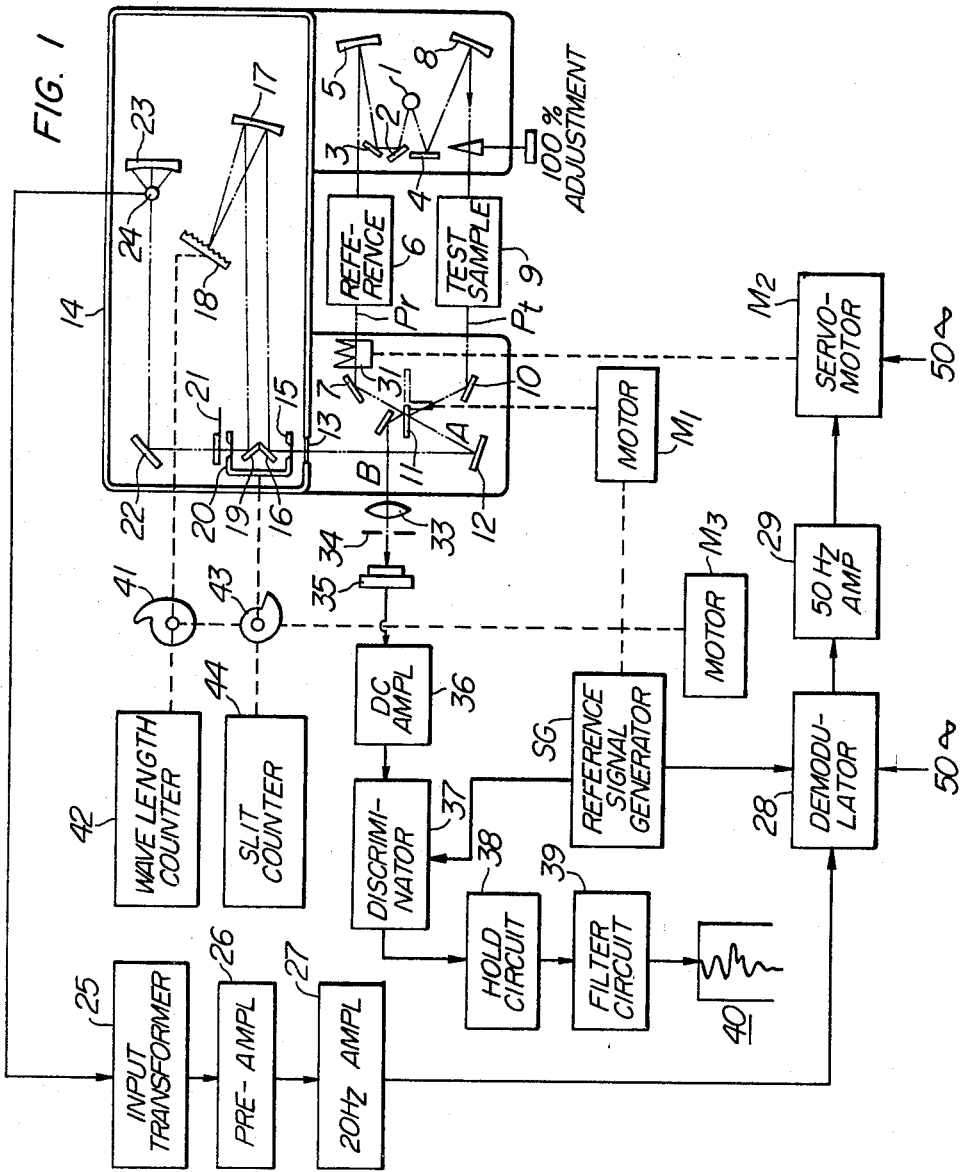

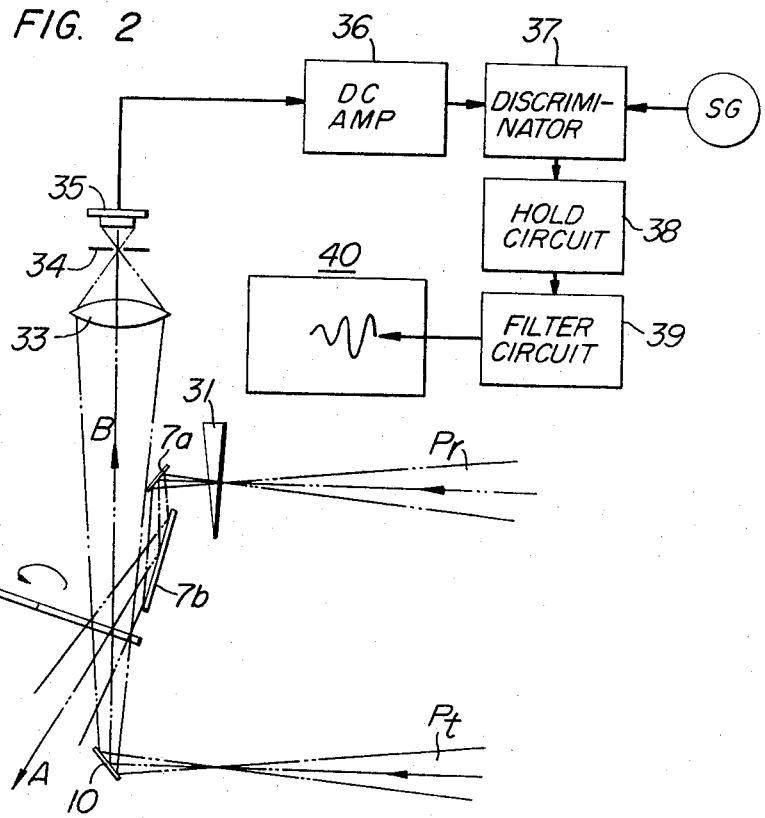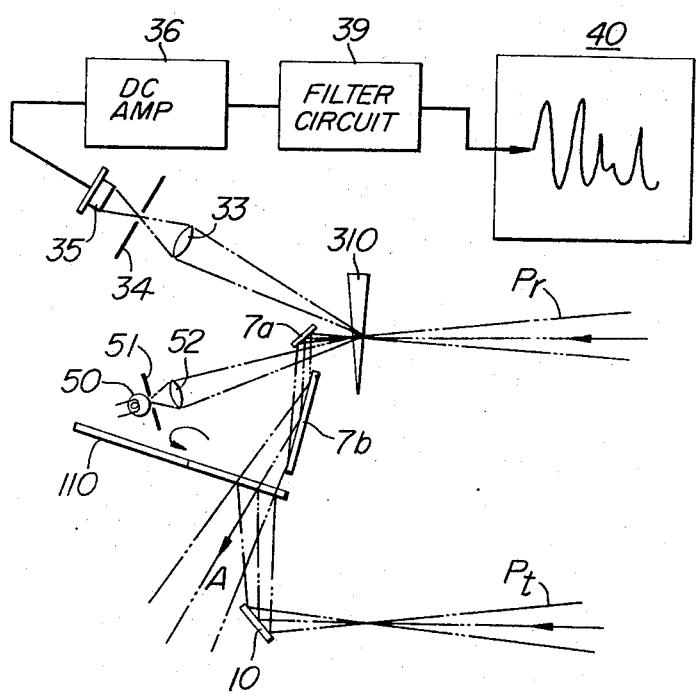

OPTICAL NULL METHOD SPECTROPHOTOMETERS

BACKGROUND OF THE INVENTION

1. Field of the Invention

This invention relates to an optical null method spectrophotometer, and more particularly to such a spectrophotometer with which the variation in a reference sample beam resulting from the displacement of an optical attenuator is converted into an electrical signal and which is provided with separate means for recording such an electrical signal to effect a high-speed recording operation.

2. Description of the Prior Art

In recent years, requirements for high-speed measurement in a spectrophotometer have been increasing for the purpose of following up or monitoring a chemical reaction process or other processes.

With an optical null method spectrophotometer, it has generally been the practice that a reference sample beam having an intensity proportional to the quantity of light transmitted through a reference sample and a test sample beam having an intensity proportional to the quantity of light transmitted through a test sample are detected by a detector and the difference between two electrical signals corresponding to the respective intensities of both beams are amplified to drive a servo-motor. An optical attenuator and a recording pen are mechanically connected directly to the shaft of the servo-motor so that a mechanical feedback signal is applied to the optical attenuator in accordance with the aforesaid intensities of the reference and test sample beams while the feedback quantity is recorded on a sheet of recording paper by the recording pen, whereby there is obtained transmission spectra or absorption spectra of the test sample in accordance with the wave length scanning.

To obtain a high-speed measuring operation with such an optical null method spectrophotometer, the problems encountered include the following:

1. There exists an inertia of the recording-pen driving portion which occupies the greater part of the load in the recording system and friction involved with said portion. The optical attenuator itself can be made light enough in weight and the drive load of the optical attenuator offers little or no problem regarding the speed of the measuring operation. For example, the amount of displacement for the optical attenuator is approximately 40 to 100 mm, while that for the recording pen is 100 to 200 mm, which is greater by three times or more than that for the optical attenuator, and accordingly the load of the recording pen is considerably large.

2. In a spectrophotometer intended for the measurement of light in the infrared range, the response time of the detector is the governing factor to limit the highest measuring speed available for the spectrophotometer. To detect infrared rays, use is made of a thermal detector such as a thermocouple, bolometer, pneumatic cell or the like which converts light energy into thermal energy and measures the resulting resistance, electromotive force or physical variation such as gas expansion or the like. Although these thermal detectors usually have a large time constant, and are not so highly sensitive as compared with a photoelectric element including photo-multiplier tube intended to detect light in the visible range, they are widely used in the infrared range and their sensitivity as thermal detectors is independent of wave length, that is, because the sensitivity is proportional to the energy of the incident light independently of wave length. Among these thermal detectors, the thermocouple is most widely used as a detector for the normal infrared range (2.5 $\mu$ to 25 $\mu$).

In the spectrophotometer intended for the measurement of light in the infrared range, light from a source of light is periodically interrupted by a chopper within the spectrophotometer so as to be projected upon a detector, and an AC output produced by the detector is amplified by an amplifier tuned with the interruption frequency to thereby prevent any drift from arising in the detector output and to improve the S/N ratio. In other words, by interrupting the light and directly amplifying a quantity corresponding thereto, the detector is made immune to the influence resulting from its ambient temperature variation and the light which would otherwise be projected upon the detector without being interrupted. In this case, however, there is still a problem as to whether the detector will properly respond to the light energy when the light is interrupted at a certain frequency. The smaller the time constant of the thermocouple (i.e. the time from the abrupt cutoff of the radiation incident upon the thermocouple till the drop of its output to $1/e$ of its initial output), the easier it is to increase the interruption frequency of the light beam and to provide a higher speed of measurement. Nevertheless, the time constant of the thermocouple is usually of the order of 10 to 20 milli-seconds. and the time constant of the entire device is ultimately limited to the time constant of the thermocouple.

The relation between the time constant of the entire device (i.e. the velocity at which the device responds to an input signal) and the scanning velocity is such that a scanning velocity far in excess of the time constant of the device would cause the spectra curve recorded to become distorted and accordingly decrease not only the apparent spectrum intensity, but also the resolving power. The light beam interruption frequency is usually selected at a suitable level primarily in accordance with the time constant of the detector so that the greatest possible S/N ratio may be provided. A greater S/N ratio can be provided by selecting a greater time constant, whereas this is incompatible with the desire for a higher measuring speed because the use of a greater time constant presupposes a slower wave length scanning velocity which is necessary to eliminate the distortion of the recorded spectra curve.

For the reasons set forth above, in the known optical null method spectrophotometer, the time constant of the device itself has inevitably been greater than that of the detector and as a result, the light beam interruption frequency has been limited to around 10 Hz.

SUMMARY OF THE INVENTION

It is an object of the present invention to provide an optical null method spectrophotometer which has improved means for transmitting signals to a recording system.

It is another object of the present invention to provide an optical null method spectrophotometer which is provided with separate means for producing an electrical signal proportional to a variation in the reference light beam resulting from the displacement of an optical attenuator, whereby such an electrical signal is recorded by a recorder to increase the measuring speed.

It is still another object of the present invention to provide an optical null method spectrophotometer in which a balancing system using a servo mechanism is separate from a recording system and the time constant of the entire device is approximate as far as possible to that of a detector to thereby provide a higher measuring speed than by the prior art device.

It is yet another object of the present invention to provide an optical null method spectrophotometer which is intended to detect light beams in the infrared range and in which the detection system is improved in its response time to such a degree that the time constant of the entire device can be reduced so as to equal that of an infrared ray detector such as a thermocouple or the like.

Other objects and features of the present invention will become fully apparent from the following detailed description taken in conjunction with the accompanying drawings.

BRIEF DESCRIPTION OF THE DRAWINGS

FIG. 1 is a diagrammatic plan view showing an example of the optical null method spectrophotometer according to the present invention.

FIG. 2 is a diagrammatic view showing the essential portion of the FIG. 1 embodiment.

FIG. 3 is a diagrammatic view showing another example of the FIG. 2 portion.

DESCRIPTION OF THE PREFERRED EMBODIMENTS

Referring to FIG. 1, there is shown an example of the optical null method spectrophotometer according to the present invention. In the figure, solid lines represent electrical connections, interrupted lines represent mechanical connections and dot-and-dash lines represent optical paths.

The shown example includes a source of light 1 such as the Globar (trade name), a commercial heater of bonded silicon carbide, having a continuous spectrum. The light from the source of light 1 is divided into a path of light passing through a reference sample and a path of light passing through a test sample, by mirrors 2, 3 and 4. The light beam passing through the reference sample is directed through a spherical mirror 5 to a reference sample cell 6 having the reference sample disposed therein, through which it is converted into a beam having an intensity proportional to the quantity of light transmitted through the reference sample, and further directed by mirror 7 to a sector mirror 11. The light beam passing through the test sample is directed through a spherical mirror 8 into a test sample cell 9 having the test sample disposed therein, through which it is converted into a beam having an intensity of light proportional to the quantity of light transmitted through the test sample, and further directed by a mirror 10 to a sector mirror 11. The sector mirror 11 comprises a semi-circular rotary mirror driven by a motor M1. Both sides of the sector mirror 11 form mirror surfaces, so that each time the sector mirror 11 effects half a rotation, the reference sample beam and test sample beam are reflected or passed by the mirror 11 and taken out alternately in directions A and B (see FIG. 2). In the present embodiment, the light beam interruption frequency of the sector mirror 11 is selected to be 20 Hz, and synchronized with the rotation of the sector mirror 11, reference signals are generated by a reference signal generator SG.

As a result, there is obtained in the direction A a series of alternate pulse beams comprising a reference sample beam Pr having an intensity of light proportional to the quantity of light transmitted through the reference sample and a test sample beam Pt having an intensity of light proportional to the quantity of light transmitted through the test sample beam, the beams Pr and Pt being disposed in alternate relationship in a common channel.

Similarly, in the direction B, there is obtained a series of alternate pulse beams comprising a reference sample beam Pr and a test sample beam Pt disposed in alternate relationship in a common channel.

A series of pulse beams travelling in the direction A is directed through a monochromator to an optical null method servo mechanism. In other words, the light directed by a mirror 12 to a monochromator 14 passes through an entrance window 13 to enter an entrance slit 15. This light passes through a mirror 16 and a paraboloidal mirror 17 into a diffraction grating 18, where the light is dispersed into various wave length spectra by the diffracting action of the grating. Only part of the dispersed light which has a specific wave length is passed through the paraboloidal mirror 17 and a mirror 19 and taken out as a monochromatic wave length light at an exit slit 20. The monochromatic light has its stray component (resulting primarily from the high order number of the diffraction grating) removed therefrom by a filter 21, whereafter it is directed by a mirror 22 to an ellipsoidal mirror 23, where that light is converted into an electrical signal by an infrared ray detector such as a thermocouple disposed at the focal point on the optic axis of the ellipsoidal mirror 23.

At the output of the detector 24 there is provided in a common channel a series of alternate pulse signals comprising a reference sample signal proportional to the intensity of light of the reference sample beam and a test sample signal proportional to the intensity of light of the test sample beam. The pulse signals are passed through an input transformer 25 and amplified by a preamplifier 26 and a 20 Hz tuned amplifier 27 (corresponding to the light beam interruption frequency 20 Hz provided by the sector mirror 11), whereafter the signals are synchronous-rectified and modulated by a rectifier-modulator 28 controlled by the reference signal from the reference signal generator SG. Thus, the rectifier-modulator 28 produces as its output an AC signal (50 Hz) which is proportional to the voltage difference between the reference signal and the test sample signal. This AC signal is amplified by a 50 Hz tuned amplifier 29 and then applied as a control signal to a servo-motor M2. The servo-motor M2 displaces a comb-shaped or wedge-shaped optical attenuator disposed in the reference sample light path in accordance with the magnitude and polarity of the control signal, thereby increasing or decreasing the quantity of light of the reference sample beam so that the reference sample beam and the test sample beam may always be balanced with each other, or that the output applied to the servo-motor M2 may always be zero. Therefore, if there is any variation in the light transmission and absorption of the test sample as a result of the wave length scanning, the motor M2 will be rotated in accordance with that variation to thereby vary the quantity of light of the reference sample beam.

According to the prior art system, in the above-described optical null method, a recording pen is mounted on the shaft of the servo-motor so as to record the mode of such variation or the variation in the transmission spectra or absorption spectra of the test sample on a sheet of recording paper in response to the displacement of the optical attenuator. However, the inertia and friction attributed to the pen driving portion have formed a great barrier in achieving a high-speed measuring operation, together with the unfavorable fact that the response time of the detector for the infrared range is slower than that of the photo-detector such as a photocell intended mainly to detect light in the visible range.

For this reason, according to the present embodiment, the balancing system is arranged in the conventional manner, while the measuring-recording system is provided separately and a photo-detector such as a photocell for the visible range is employed as the detector, whereby the time constant of the entire device is made approximate as far as possible to that of the infrared ray detector such as a thermocouple to thereby provide a high-speed measuring operation.

Description will now be made of the measuring-recording system with reference to FIGS. 1 and 2.

The series of alternate light pulses taken out in the direction B by the sector mirror 11 and comprising the reference sample beam Pr having an intensity proportional to the quantity of light transmitted through the reference sample and the test sample beam Pt having an intensity proportional to the quantity of light transmitted through the test sample are passed through a lens system 33 and a slit 34 and then converted into electrical signals by a photoelectric converter element 35 such as a solar cell or photo-multiplier tube having a sensitivity mainly to light in the visible range.

At the output of the photoelectric converter element 35 there are produced alternately in a common channel a reference signal having an amplitude proportional to the intensity of light of the reference sample beam and a test sample signal having an amplitude proportional to the intensity of light of the test sample beam. The series of pulse signals are amplified by a DC amplifier 36 and then applied to a discriminator circuit 37 controlled by the reference signal from the reference signal generator SG, so that only the reference signal appears at the output of the discriminator circuit 37. This reference signal has an amplitude proportional to the variation in the reference sample beam (visible light) resulting from the displacement of the optical attenuator 31 driven by the aforesaid servo mechanism, that is, the variation in the transmission or absorption of the test sample. The same reference signal is applied to a hold circuit 38 where the peak value of the signal is held for each pulse. As the result, the input pulse signal is converted into a DC signal corresponding to that peak value. The output of the hold circuit 38 is applied to a filter circuit 39 which comprises a low pass filter to remove any noise, forming high frequency component contained in the signal. The output of the filter circuit 39 is applied to a high-speed recorder 40 of the hot pen type, photosensitive type or other type, which thus records a spectra representing the variation in the transmission-absorption of the test sample.

The wave length scanning is driven by a motor M3. It is accomplished by the diffraction grating 18 rotated by a wavelength cam 41. The wavelength thus scanned is indicated by a wavelength counter 42. Along with the wavelength scanning, the width of the entrance and exit slits are controlled by a slit cam 43 and indicated by a slit counter 44.

According to the above-described embodiment of the present invention, the measuring-recording system is provided separately from the servo system so that the problem of inertia, friction and other factors attributed to the pen driving portion and applied to the servo system and accordingly the problem of delayed response velocity of the servo system can be solved to increase the measuring and recording speed. Moreover, a photoelectric element such as a solar cell used as the detector for the measuring-recording system enables the time constant of this system to approximate that of the infrared ray detector of the servo system, and this results in a higher operating speed than in the prior art.

In the example shown and described above, a light beam interruption frequency of 20 Hz has been selected for the sector mirror, whereby the full-scale scanning time of the recording pen (the time required to scan 0–100 percent transmission) has been about 0.6 seconds which means approximately ¼ of the conventional scanning time, and the resulting spectra have been substantially free of scanning distortion.

Another embodiment of the present invention will now be described with reference to FIG. 3, which diagrammatically shows the arrangement of the measuring-recording system corresponding to FIG. 2. In FIG. 3, like characters represent like parts shown in FIG. 2. The arrangement of FIG. 3 includes a source of light 50 such as an ordinary incandescent lamp, a slit 51 and a lens system 52. The light from the source of light 50 is directed through the slit 51 and lens system 52 and projected upon an optical attenuator 310. One side of the optical attenuator 310 (that side which receives the light from the source of light 50) is formed into a mirror surface, which reflects the light and sends it through a lens system 33 and a slit 34 into a photoelectric converter 35 such as a photocell intended mainly to detect light in the visible range, where the light is converted into an electrical signal.

The light thus detected by the photoelectric element 35 is proportional to the amount of displacement of the optical attenuator, and therefore such a signal treating system as described with respect to FIG. 2 is not required. The output of the detector 35 is amplified by a DC amplifier 36 and then applied through a filter circuit 39 directly to a high-speed recorder 40, which will thus record a quantity proportional to the displacement of the optical attenuator, that is, the transmission spectra or absorption spectra of the test sample.

In the embodiment of FIG. 3 a sector mirror 110 comprises a semi-circular rotary plate having one side thereof formed into a mirror surface. As a result, each time the mirror 110 effects half a rotation, the reference sample beam Pr and the test sample beam Pt are reflected or passed by that mirror to produce in the direction A alternate series of light pulses comprising reference and test sample beams Pr and Pt appearing alternately in a common channel. The pulse beam thus moving in the direction A is formed into monochromatic light by the monochromator 14 as shown in FIG. 1, and thereafter converted into an electric signal by the infrared ray detector 24. Descriptions of the subsequent processes are omitted because they have already described with respect to FIG. 1.

What is claimed is:
1. An optical null method spectrophotometer comprising:
   means for alternately interrupting and passing a test sample beam having an intensity proportional to the quantity of light transmitted through a test sample and a reference sample beam having an intensity proportional to the quantity of light transmitted through a reference sample to thereby produce first and second alternate series of light pulses each series comprising said test sample beam and said reference sample beam disposed alternately in a common channel;
   first means for producing electrical signals proportional to said first alternate series of light pulses said electrical signals being a reference signal having an amplitude proportional to the intensity of said reference sample beam and a test sample signal having an amplitude proportional to the intensity of said test sample beam said signals being disposed in alternate relationship with each other in the common channel;
   means for displacing an optical attenuator inserted in the path of said reference sample beam to thereby varying the quantity of light of said reference sample beam in accordance with the variation in the quantity of light of said test sample beam, so as to balance the intensities of said reference and test sample signals with each other;
   second means for receiving said second alternate series of light pulses and for producing an electrical signal proportional to the variation in the quantity of light of said reference sample beam resulting from said displacement of said optical attenuator; and
   means for indicating a value proportional to said variation in said reference sample beam on the basis of the electrical signal produced by said second means.
2. An optical null method spectrophotometer according to claim 1, further including means for amplifying electrical signals produced by said second means, means for taking out of said electrical signals only an electrical signal proportional to the intensity of said reference sample beam corresponding to the displacement of said optical attenuator, a hold circuit for holding the peak value of said electrical signal proportional to the intensity of said reference sample beam, low pass filtering means for averaging the output of said hold circuit, and wherein said means for indicating a value comprises means for recording the output of said low pass filtering means.
3. A spectrophotometer according to claim 2, wherein said taking out means comprises a discriminator connected between said means for amplifying electrical signals produced by said second means and said hold circuit, and further including a reference signal generator connected to said discriminator and to said means for displacing said optical attenuator.
4. A spectrophotometer according to claim 3, wherein said second means comprises a photoelectric converter element, the output of which is connected to said amplifying means and further including an input transformer, a preamplifier means and a filter amplifier means connected in series to the output of said first means, and a demodulator connected to the output of said reference signal generator and said series connected circuit to control said displacing means.
5. A spectrophotometer according to claim 4, wherein said alternately interrupting and passing means comprises a semi-circular rotary plate having both sides thereof formed into mirror surfaces to thereby produce in a first and a second direction said first and second alternate series of light pulses comprising said test sample beam and said reference sample beam disposed alternately in a common channel.
6. A spectrophotometer according to claim 5, further including a first motor means connected to the output of said reference signal generator and to said semi-circular rotary plate for driving said rotary plate in response to the output of said signal generator.
7. An optical null method spectrophotometer comprising:
   means for alternately interrupting and passing a test sample beam having an intensity proportional to the quantity of light transmitted through a test sample and a reference sample beam having an intensity proportional to the quantity of light transmitted through a reference sample to thereby produce alternate series of light pulses comprising said test sample beam and said reference sample beam disposed alternately in a common channel;

first means for producing electrical signals proportional to said alternate series of light pulses, said electrical signals being a reference signal having an amplitude proportional to the intensity of said reference sample beam and a test sample signal having an amplitude proportional to the intensity of said test sample beam disposed in alternate relationship with each other in the common channel;

means for displacing an optical attenuator inserted in the path of said reference sample beam to thereby varying the quantity of light of said reference sample beam in accordance with the variation in the quantity of light of said test sample beam, so as to balance the intensitites of said reference and test sample signals with each other;

second means for producing an electrical signal proportional to the variation in the quantity of light of said reference sample beam resulting from said displacement of said optical attenuator; and means for indicating a value proportional to said variation in said reference sample beam on the basis of the electrical signal produced by said second means, wherein said first means for producing the electrical signals proportional to said alternate series of light pulses comprises a thermal detector including thermocouple, and said second means for producing electrical signal proportional to the variation in the quantity of light of said reference sample beam resulting from the displacement of said optical attenuator comprises a photoelectric element including photocell.

8. An optical null method spectrophotometer comprising:

means for alternately interrupting and passing a test sample beam having an intensity proportional to the quantity of light transmitted through a test sample and a reference sample beam having an intensity proportional to the quantity of light transmitted through a reference sample to thereby produce alternate series of light pulses comprising a said test sample beam and said reference sample beam disposed alternately in a common channel;

first means for producing electrical signals proportional to said alternate series of light pulses, said electrical signals being a reference signal having an amplitude proportional to the intensity of light of said reference sample beam disposed in alternate relationship with said test sample beam in the common channel and a test sample signal having an amplitude proportional to the intensity of light of said test sample beam;

means for displacing an optical attenuator inserted in the path of said reference sample beam to thereby varying the quantity of light of said reference sample beam in accordance with the variation in the quantity of light of said test sample beam, so as to balance the intensities of said reference and test sample signals with each other, said attenuator having one side thereof formed into a mirror surface to provide a reflection surface upon which light is projected;

second means for detecting light reflected by said reflection surface of said optical attenuator and proportional to the amount of displacement of said optical attenuator to thereby convert that light into an electrical signal; and means for indicating a value proportional to said amount of displacement of said optical attenuator on the basis of the electrical signal produced by said second means.

9. An optical null method spectrophotometer as defined in claim 8, wherein said first means for producing the electrical signals proportional to said alternate series of light pulses comprises a thermal detector including thermo-couple, and said second means for detecting the light proportional to the amount of displacement of said optical attenuator and converting that light into an electrical signal comprises a photoelectric element including photocell.

10. A spectrophotometer according to claim 8, wherein said second means comprises means for generating an additional light beam other than that transmitted through said test sample and said reference sample beam.

11. An optical null method spectrophotometer comprising:

means for alternately interrupting and passing a test sample beam having an intensity proportional to the quantity of light transmitted through a test sample and a reference sample beam having an intensity proportional to the quantity of light transmitted through a reference sample said means comprising a semi-circular rotary plate having both sides thereof formed into mirror surfaces to thereby produce in a first and a second direction alternate series of light pulses each series comprising said test sample beam and said reference sample beam disposed alternately in a common channel;

first means for producing electrical signals proportional to said alternate series of light pulses directed in said first direction, said electrical signals being a reference signal having an amplitude proportional to the intensity of light of said reference sample beam and a test sample signal having an amplitude proportional to the intensity of light of said test sample beam disposed in alternate relationship with each other in the common channel;

means for displacing an optical attenuator inserted in the path of said reference sample beam to thereby varying the quantity of light of said reference sample beam in accordance with the variation in the quantity of light of said test sample beam so as to balance the intensities of said reference and test sample signals with each other;

second means for producing electrical signals proportional to said alternate series of light pulses directed in said second direction, said electrical signals being a reference signal and a test sample signal disposed alternately in a common channel;

means for separating said reference signal from said electrical signals produced by said second means; and means for indicating a value proportional to the variation in the quantity of light of said reference sample beam on the basis of said separated reference signal.

12. An optical null method spectrophotometer as defined in claim 11, wherein said first means for producing the electrical signals proportional to said alternate series of light pulses comprises a thermal detector including thermo-couple, and said second means for producing electrical signals proportional to said alternate series of light pulses comprises a photoelectric element including photocell.

13. An optical null method spectrophotometer comprising:

a light source for irradiating samples;

an optical lens system for dividing the light emitted by said light source into an optical path across which a test sample is placed and another optical path across which a reference sample is placed;

means for alternately interrupting and passing a sample beam having an intensity proportional to the quantity of light passed through said test sample and a reference beam having an intensity proportional to the quantity of light passed through said reference sample to produce two alternate series of light pulses each series comprising said sample and reference beams disposed in a common channel;

a monochromator for dispersing one of said alternate series of light pulses into wavelengths in the infrared region;

first means, comprising a thermal detector, for producing electrical signals proportional to said alternate series of light pulses dispersed by said monochromator, said electrical signals comprising a reference signal having an amplitude proportional to the intensity of said reference beam and a sample signal having an amplitude proportional to the intensity of said sample beam disposed alternately in a common channel;

means for displacing an optical attenuator placed across said optical path of said reference beam so as to balance the intensities of said reference signal and said sample signal to vary the quantity of light of said reference beam in accordance with the variation in the quantity of light of said sample beam;

second means, comprising a photoelectric element for detecting light in the visible region, for producing electrical signals proportional to the other of said alternate series of light pulses, said electrical signals comprising electric pulses having an amplitude proportional to the light intensity of said sample beam and pulses having an amplitude proportional to the light intensity of said reference beam disposed alternately in a common channel;

means for deriving only an electrical signal proportional to the light intensity of said reference beam corresponding to the displacement of said optical attenuator from said electrical signals produced by said second means;

a hold circuit for holding the peak value of said electrical signal proportional to the light intensity of said reference beam derived by said deriving means;

low pass filtering means for averaging the output of said hold circuit; and means for recording the output of said low pass filtering means.

14. An optical null method spectrophotometer comprising:

a first light source;

an optical system for dividing the light emitted by said first light source into a sample beam path across which a test sample is placed and a reference beam path across which a reference sample is placed;

means for alternately interrupting and passing a sample beam having an intensity proportional to the quantity of light passed through said test sample and a reference beam having an intensity proportional to the quantity of light passed through said reference sample to produce alternate series of light pulses of said sample and reference beams disposed in a common channel;

a monochromator for dispersing said alternate series of light pulses into wavelengths in the infrared region;

first means, comprising a thermal detector, for producing electrical signals proportional to said alternate series of light pulses dispersed by said monochromator, said electrical signals comprising a reference signal having an amplitude proportional to the intensity of said reference beam and a sample signal having an amplitude proportional to the intensity of said sample beam disposed alternately in a common channel;

means for displacing an optical attenuator placed across said optical path of said reference beam so as to balance the intensities of said reference signal and said sample signal to vary the quantity of light of said reference beam in accordance with the variation in the quantity of light of said sample beam, said optical attenuator being made specular on one of its side surfaces;

a second light source including an incandescent lamp;

second means for producing an electrical signal proportional to the intensity of the light emitted by said second light source and reflected by said specular surface of said optical attenuator, said reflected light having an intensity proportional to the light intensity of said reference beam corresponding to the displacement of said optical attenuator; and means for displaying values proportional to the variation in the intensity of said reference beam based on said electrical signal produced by said second means.

* * * * *